United States Patent
Susca et al.

(10) Patent No.: US 12,241,414 B1
(45) Date of Patent: Mar. 4, 2025

(54) SINGLE VARIABLE DISPLACEMENT FUEL SYSTEMS WITH FUEL OIL COOLER BYPASS AND GAS GENERATOR FAULT ACCOMMODATION

(71) Applicant: Hamilton Sundstrand Corporation, Charlotte, NC (US)

(72) Inventors: Ryan Prescott Susca, Windsor, CT (US); Sachin Ramprashad, West Hartford, CT (US); Ryan Shook, Walla Walla, WA (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 18/390,197

(22) Filed: Dec. 20, 2023

(51) Int. Cl.
*F02C 7/14* (2006.01)
*F02C 7/22* (2006.01)
*F23R 3/28* (2006.01)

(52) U.S. Cl.
CPC .................. *F02C 7/14* (2013.01); *F02C 7/22* (2013.01); *F23R 3/28* (2013.01)

(58) Field of Classification Search
CPC .......... F02C 7/14; F02C 9/36; F02D 41/3082; F04B 1/328; F04B 2205/05; F04B 49/065; F04B 49/08; F05D 2260/213; F02M 59/28; F02M 59/04
See application file for complete search history.

(56) References Cited

U.S. PATENT DOCUMENTS

| 11,098,647 | B2 * | 8/2021 | Miller | B64D 37/34 |
| 2013/0086909 | A1 * | 4/2013 | Wang | F02C 9/36 |
| | | | | 60/730 |
| 2018/0340501 | A1 * | 11/2018 | Ni | F04B 49/08 |
| 2019/0153954 | A1 * | 5/2019 | Miller | F02C 7/14 |

FOREIGN PATENT DOCUMENTS

EP 694120 A1 1/1996

* cited by examiner

*Primary Examiner* — Anthony Ayala Delgado
(74) *Attorney, Agent, or Firm* — Kinney & Lange, P.A.

(57) ABSTRACT

A system includes an actuation pump sub-system (APS). A fuel oil cooler (FOC) is included in a first branch of a supply line. The FOC is in fluid communication to receive flow from a second outlet of the APS. The APS includes a bypass valve (BPV) in a second branch of the supply line, in parallel with the FOC and in fluid communication to allow flow from the third outlet into the supply line bypassing the FOC. A combined main and augmentor pump sub-system (CMAPS) has a main inlet connected in fluid communication with the supply line downstream of the BPV and FOC, a gas generator (GG) outlet for supplying fuel to a downstream gas generator, and an augmentor outlet for supplying fuel to a downstream augmentor.

19 Claims, 1 Drawing Sheet

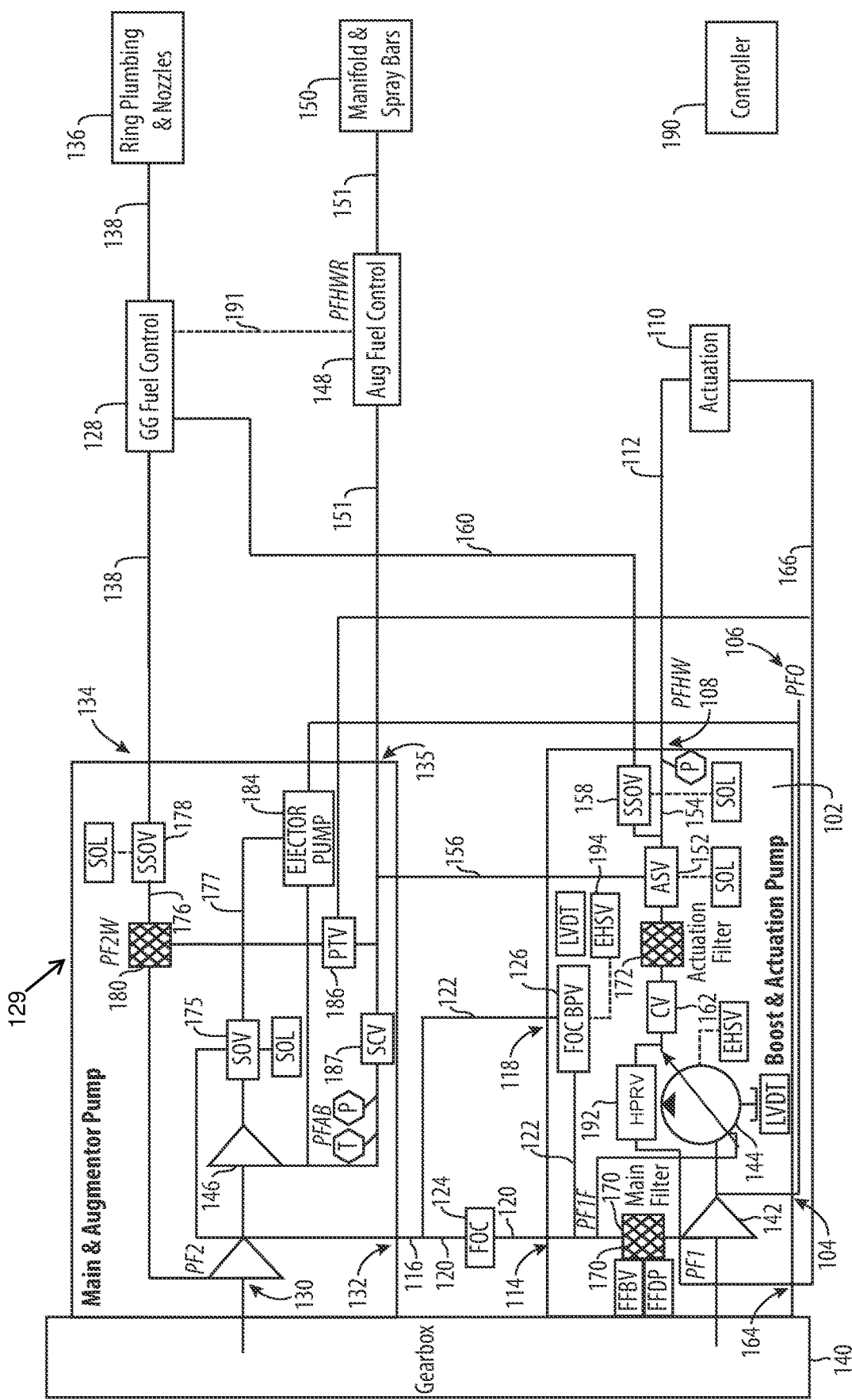

SINGLE VARIABLE DISPLACEMENT FUEL SYSTEMS WITH FUEL OIL COOLER BYPASS AND GAS GENERATOR FAULT ACCOMMODATION

BACKGROUND

1. Field

The present disclosure relates to fuel systems, and more particularly to fuel systems for aircraft.

2. Description of Related Art

In modern aircraft it would be advantageous to eliminate the thermal recirculation system. This would reduce the number of fuel system components, and free space for carrying more fuel. However, thermal recirculation cannot typically be eliminated because the fuel oil coolers (FOC) in typical aircraft have over-temperature heat loads at low burn flow conditions, necessitating thermal recirculation systems.

The conventional techniques have been considered satisfactory for their intended purpose. However, there is an ever present need for improved systems and methods for handling heat loads in fuel systems. This disclosure provides a solution for this need.

SUMMARY

A system includes an actuation pump sub-system (APS) with an inlet configured to feed fuel from a fuel source into the APS, a first outlet configured for connecting the APS in fluid communication with an actuation system to supply fuel flow for actuation, a second outlet feeding into a supply line, and a third outlet feeding into the supply line. A fuel oil cooler (FOC) is included in a first branch of the supply line. The FOC is in fluid communication to receive flow from the second outlet. The APS includes a bypass valve (BPV) in a second branch of the supply line, in parallel with the FOC and in fluid communication to allow flow from the third outlet into the supply line bypassing the FOC. A combined main and augmentor pump sub-system (CMAPS) has a main inlet connected in fluid communication with the supply line downstream of the BPV and FOC, a gas generator (GG) outlet for supplying fuel to a downstream gas generator, and an augmentor outlet for supplying fuel to a downstream augmentor.

The system can be devoid of a thermal recirculation system. The gas generator can be connected in fluid communication with the GG outlet of the CMAPS. The actuation system can be connected in fluid communication with the augmentor outlet. A gearbox can be included, wherein the gearbox is connected to drive one or more fuel pumps in the APS, and to drive one or more pumps of the CMAPS.

The combined main and augmentor pump can include a centrifugal (or pressure setting) main pump and a centrifugal (or pressure setting) augmentor pump. The main pump and the augmentor pump can each be operatively connected to be driven by the gearbox. An outlet of the augmentor pump can be connected in fluid communication to supply an augmentor control. An outlet of the main pump can be connected in fluid communication to supply a GG fuel control. The APS can include a boost pump operatively connected between the inlet of the APS and the second outlet of the APS for boosting pressure of fuel from the supply to the pressure in the supply line.

The APS can include a variable displacement pump (VDP) with a pump inlet in fluid communication to be supplied with boosted pressure from the boost pump, and a pump outlet connected in fluid communication with the first outlet of the APS. An augmentor selector valve (ASV) can be included in a line connecting the pump outlet of the VDP with the outlet of the APS. The ASV can be connected in fluid communication with a line connecting between the augmentor pump and the augmentor control for backup supply to the augmentor control from the APS. The APS can include a port connected in fluid communication with the outlet of the boost pump and the actuation system for return of fluid from the actuation system. The second outlet can be connected in fluid communication with an outlet of the main pump. The third outlet can also connected in fluid communication with the outlet of the main pump.

The CMAPS can include an ejector pump, PTV, and a shutoff valve each in fluid communication with a line from the outlet of the augmentor pump. A solenoid shutoff valve can be included in a pump outlet line of the main pump for selectively shutting off flow to the GG fuel control. A cross-over line can be connected in fluid communication from a shutoff valve in APS downstream of the ASV to the GG fuel control for back up of the MPCS by the APS. A main pump wash screen can be included in fluid communication between the main pump and the solenoid shutoff valve. A pressure fluid hydraulic washed regulated (PFHWR) line can selectively connect the GG fuel control in fluid communication with the augmentor fuel control.

A main filter can be included in a line connecting the boost pump to the second outlet of the APS. An actuation filter can be included in the line connecting the pump outlet of the first VDP with the first outlet of the APS. A controller can be operatively connected to control the BPV, the VDP, and the ASV. The controller can be operatively connected to sensors in the CMAPS and APS for feedback in controlling the BPV, the VDP, and the ASV.

A method of controlling heat transfer in a fuel oil cooler (FOC) includes flowing fuel into an inlet of the FOC, through the FOC, and out an outlet of the FOC to absorb heat from oil flowing through the FOC while the oil has a temperature above a pre-determined overcooling limit and bypassing the FOC through a bypass valve connected in fluid communication with the inlet and the outlet in parallel with the FOC when the burn flow exceeds oil cooling demand to avoid overcooling the oil beyond a predetermined overcooling limit. Bypassing the FOC through the bypass valve includes actuating the bypass valve with pressurized fuel from an actuation pump sub-system (APS). The method includes supplying boost pressure from the APS to a combined main and augmentor pump through the FOC and/or bypass valve. Bypassing the FOC can be performed aboard an aircraft without flowing any fuel through any thermal recirculation system of the aircraft.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain FIGURES, wherein:

FIG. 1 is a schematic view of an embodiment of a system constructed in accordance with the present disclosure, showing the variable displacement pump, the fuel oil cooler (FOC), and the bypass valve for bypassing the FOC.

DETAILED DESCRIPTION OF THE PREFERRED EMBODIMENTS

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. The systems and methods described herein can be used to eliminate the need for fuel thermal recirculation system, by pairing a thermally efficient fuel system with the ability to modulate fuel flow to the fuel oil cooler (FOC) to prevent overcooling engine oil, e.g. aboard aircraft.

A system 100 includes an actuation pump sub-system (APS) 102 with an inlet 104 configured to feed fuel from a fuel source 106, e.g. the fuel tanks of an aircraft, into the APS 102. The APS 102 includes a first outlet 108 configured for connecting the APS 102 in fluid communication with an actuation system 110 through a line 112 to supply fuel flow for actuation. The APS 102 includes a second outlet 114 feeding into a first branch 120 of a supply line 116, and a third outlet 118 feeding into a second branch 122 of the supply line 116.

A fuel oil cooler (FOC) 124 is included in the first branch 120 of the supply line 116. The FOC 124 is in fluid communication to receive flow from the second outlet 114. The APS 102 includes a bypass valve (BPV) 126 in the second branch 122 of the supply line 116, in parallel with the FOC 124 and in fluid communication to allow flow from the third outlet 118 into the supply line 116 bypassing the FOC 124. A combined main and augmentor pump sub-system (CMAPS) 129 includes a main pump 130 for supplying a gas generator (GG) fuel control 128. The main pump 130 has a main inlet 132 connected in fluid communication with the supply line 116 downstream of the BPV 126 and the FOC 124. The main pump 130 includes a GG outlet 134 for supplying fuel to a downstream gas generator 136, e.g. ring plumbing and nozzles of a gas turbine engine of an aircraft, through a line 138. The CMAPS 129 also includes an augmentor outlet 135 for supplying fuel to a downstream augmentor fuel control 148 and augmentor 150, e.g. manifold and spray bars of a gas turbine engine, through a line 151. The bypass function of the FOC 124 and BPV 126 make it possible for the system 100 to be devoid of a thermal recirculation system, which provides a weight savings that is valuable for aircraft, as well as a savings in complexity.

A gearbox 140 is connected to drive one or more fuel pumps 142, 144 in the APS 102, and to drive the main pump 130. The main pump 130 is a fixed displacement pump and the CMAPS 129 includes an augmentor pump 146, and both pumps 130 and 146 are operatively connected to be driven by the gearbox 140. An outlet of the augmentor pump 146 is connected in fluid communication to supply the augmentor control 148, and the outlet of the main pump 130 is connected in fluid communication to supply the GG fuel control 128.

The APS 102 includes a boost pump 142 operatively connected between the inlet 104 of the APS 102 and the second outlet 114 of the APS 102 for boosting pressure of fuel from the supply 106 to the pressure in the supply line 116. The APS 102 includes a variable displacement pump (VDP) 144 with a pump inlet in fluid communication to be supplied with boosted pressure from the boost pump 142, and a pump outlet connected in fluid communication with the first outlet 108 of the APS 102. The APS 102 includes a high pressure relief valve (HPRV) 192 configured to return over pressure flow from downstream of the VDP 144. A solenoid controlled augmentor selector valve (ASV) 152 is included in a line 154 connecting the pump outlet of the VDP 144 with the outlet 108 of the APS 102. The ASV 152 is connected in fluid communication with a line 156 connecting between the line 151 at the outlet or the augmentor pump 146 and the augmentor control 148 for backup of actuation system 110 from the augmentor pump 146, in which case, a check valve 162 prevents backflow into the VDP 144. Similarly, there is a solenoid controlled shutoff valve 158 connected in fluid communication with the line 154 and a cross-over or backup line 160 connecting the APS 102 to the GG fuel control 128. The lines 156 and 160 allow backup functions for the APS 102 to back up the gas generator 136 or augmentor fuel control 148 control valve pressure.

The APS 102 includes a port 164 connected to a line 166 in fluid communication with the outlet of the boost pump 142 and the actuation system 110 for return of fluid from the actuation system 110. The first and second outlets 114, 118 are each connected in fluid communication through the supply line 116 with an outlet of the main pump 130 for supplying backup pressure to the augmentor fuel control 148. The third outlet 118 is also connected in fluid communication with the inlet 132 of the main pump 130, to supply boosted pressure to the MPCS. A main filter 170 is included in a line connecting the boost pump 142 to the second outlet 114 of the APS 102. An actuation filter 172 is included in the line 154 downstream of the check valve 162 and upstream of the ASV 152.

The CMAPS 129 includes an ejector pump 184, pump transfer valve (PTV) 186, and first and second solenoid controlled shutoff valves 178, 175 each in fluid communication with a line 177 from the outlet of the augmentor pump 146. When augmentor pump 146 is off, the PTV 186 ports PF2 pressure to the augmentor control 148 to allow control to remain primed, isolating PF1. When the augmentor pump 146 is on, the PTV 186 ports PFAB to PF1 (isolating PF2) to provide a leakage path for pump cooling which can be required during pump initialized built-in test periods or during low augmentor fuel control demand. When the augmentor pump 146 is off, the stabilizing check valve (SCV) 187 is closed, acting as a check valve, to seal the augmentor pump cavity and prevent PF2 backflow into augmentor pump 146. When the augmentor pump 146 is on, pump pressure opens the SCV 187 and the SCV 187 acts as a stability valve to prevent pressure oscillations in the plumbing due to the significant plumbing volume that can cause pump and control ringing/constructive feedback. The solenoid controlled shutoff valve (SSOV) 178 is included in the pump outlet line 176 for selectively shutting off flow to the gas generator fuel control 128 from the main pump 130. A main pump wash screen 180 is in fluid communication in the line 176 between the main pump 130 and the solenoid shutoff valve 178, and the line 177 also connects into the pump wash screen 180. A pressure fluid hydraulic washed regulated (PFHWR) line 191 can selectively connect the GG fuel control in fluid communication with the augmentor fuel control. The main fuel control 128 has an internal servo pressure regulating valve that creates PFHWR, throttling PF2 or PFHW (whichever is supplied to the control 128) to ~400 psi above PF1, for example. This pressure is fed to the EHSVs/solenoids that control positioning of the various valves within the control. This pressure is also sent to the augmentor fuel control 148 to eliminate the need for the augmentor fuel control 148 to have its own servo pressure regulator.

The ejector pump 184 is utilized to evacuate the augmentor pump cavity when the pump 146 is off to reduce is gearbox horsepower extraction (the pump rotor spins in a vacuum versus churning in fluid). PF2 pressure is feed through a nozzle to create a jet of fluid that is pointed at a receiver which is plumbed to PF1, in the space between the nozzle and the receiver is the volume connected to the augmentor pump discharge, PFAB. The fluid passing from the nozzle to the receiver creates a venturi effect pulling the fluid in the pump discharge with it, eventually evacuating the pump cavity.

A controller 190 is operatively connected to control the BPV 126 (via the electrohydraulic solenoid valve (EHSV) connected by a dotted line to BPV 126 in FIG. 1), the VDP 144 (via the EHSV connected by a dotted line to BPV 126 in FIG. 1), and the ASV 152 and solenoid controlled valves described above. The controller 190 can use feedback from the pressure sensors labeled P and T and linear variable differential transformers (LVDT's) labeled in FIG. 1 that are used as position sensors for the VDP 144 and BPV 126. The controller 190 can execute methods as disclosed herein, e.g. using machine readable instructions.

A method of controlling heat transfer in a fuel oil cooler (FOC) 124 includes flowing fuel into an inlet of the FOC 124, through the FOC 124, and out an outlet of the FOC 124 to absorb heat from oil flowing through the FOC 124 while the oil has a temperature above a pre-determined overcooling limit. The method includes bypassing the FOC 124 through a BPV 126 connected in fluid communication with the inlet and the outlet in parallel with the FOC 124 when the burn flow exceeds oil cooling demand to avoid overcooling the oil beyond a predetermined overcooling limit. Bypassing the FOC 124 through the BPV includes actuating the BPV with pressurized fuel from an actuation pump sub-system (APS) 102, e.g. where the pressurized fuel is utilized in an EHSV 194 that actuations the BPV 126. The method includes supplying boost pressure from the APS to a CMAPS 129 through the FOC 124 and/or bypass valve 126. Bypassing the FOC 124 can be performed aboard an aircraft without flowing any fuel through any thermal recirculation system of the aircraft.

Systems and methods as disclosed herein provide potential benefits including the following. They can eliminate the need for fuel thermal recirculation system by providing a fuel system that balances thermal efficiency/weight/cost, and by providing the ability to modulate fuel flow to the FOC to prevent overcooling engine oil. They also can provide optional gas generator fault accommodation (depending on single versus dual engine platforms). This can improves fuel system reliability, reduce fuel system weight/envelope, and can allows aircraft to carry more fuel. Having the BPV are inside the actuation pump section allows use of actuation pressure to actuate the BPV, helping reduce overall size and weight. The main and augmenter pumps are combined into a single CMAPS for beneficial efficiencies. There can be a seal between the main and augmentor pumps 130, 146, with a shaft layout from the gear box 140, seal, main pump 130, seal, augmentor pump 146. If the augmentor pump 146 was a standalone unit, the seal between the pump and gearbox 140 would be dry when the pump is off and subject to substantial heating due to friction. Combining the two pumps 130, 146 allows this seal to see fuel from the main pump 130 at all times, cooling the seal from one side when the augmentor pump 146 is off.

The methods and systems of the present disclosure, as described above and shown in the drawings, provide for eliminating the need for fuel thermal recirculation system, by pairing a thermally efficient fuel system with the ability to modulate fuel flow to the fuel oil cooler (FOC) to prevent overcooling engine oil, e.g. aboard aircraft. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A system comprising:
    an actuation pump sub-system (APS) with an inlet configured to feed fuel from a fuel source into the APS, a first outlet configured for connecting the APS in fluid communication with an actuation system to supply fuel flow for actuation, a second outlet feeding into a supply line, and a third outlet feeding into the supply line;
    a fuel oil cooler (FOC) in a first branch of the supply line, the FOC being in fluid communication to receive flow from the second outlet, wherein the APS includes a bypass valve (BPV) in a second branch of the supply line, in parallel with the FOC and in fluid communication to allow flow from the third outlet into the supply line bypassing the FOC;
    a combined main and augmentor pump sub-system (CMAPS) with a main inlet connected in fluid communication with the supply line downstream of the BPV and FOC, a gas generator (GG) outlet for supplying fuel to a downstream gas generator, and an augmentor outlet for supplying fuel to a downstream augmentor; and
    a gearbox, wherein the gearbox is connected to drive one or more fuel pumps in the APS, and to drive one or more pumps of the CMAPS.

2. The system as recited in claim 1, wherein the system is devoid of a thermal recirculation system.

3. The system as recited in claim 1, further comprising:
    the gas generator connected in fluid communication with the GG outlet of the CMAPS; and
    the actuation system connected in fluid communication with the augmentor outlet.

4. They system as recited in claim 1, wherein the CMAPS includes a fixed displacement main pump and a fixed displacement augmentor pump that are each operatively connected to be driven by the gearbox, wherein an outlet of the augmentor pump is connected in fluid communication to supply an augmentor control, and wherein an outlet of the main pump is connected in fluid communication to supply a GG fuel control.

5. The system as recited in claim 4, wherein the APS includes a boost pump operatively connected between the inlet of the APS and the second outlet of the APS for boosting pressure of fuel from the supply to the pressure in the supply line.

6. The system as recited in claim 5, wherein the APS includes a variable displacement pump (VDP) with a pump inlet in fluid communication to be supplied with boosted pressure from the boost pump, and a pump outlet connected in fluid communication with the first outlet of the APS.

7. The system as recited in claim 6, further comprising an augmentor selector valve (ASV) in a line connecting the pump outlet of the VDP with the outlet of the APS, wherein the ASV is connected in fluid communication with a line connecting between the augmentor pump and the augmentor control for backup supply to the augmentor control from the APS.

8. The system as recited in claim 7, wherein the APS includes a port connected in fluid communication with the outlet of the boost pump and the actuation system for return of fluid from the actuation system, wherein the second outlet is connected in fluid communication with an outlet of the main pump, and wherein the third outlet is also connected in fluid communication with the outlet of the main pump.

9. The system as recited in claim 8 wherein the CMAPS includes an ejector pump, PTV, and a shutoff valve each in fluid communication with a line from the outlet of the augmentor pump.

10. The system as recited in claim 9, further comprising a solenoid shutoff valve in a pump outlet line of the main pump for selectively shutting off flow to the GG fuel control.

11. The system as recited in claim 10, further comprising a cross-over line connected in fluid communication from a shutoff valve in APS downstream of the ASV to the GG fuel control for back up of the MPCS by the APS.

12. The system as recited in claim 11, further comprising a main pump wash screen in fluid communication between the main pump and the solenoid shutoff valve.

13. The system as recited in claim 12, comprising a PFHWR line selectively connecting the GG fuel control in fluid communication with the augmentor fuel control.

14. The system as recited in claim 12, further comprising a main filter in a line connecting the boost pump to the second outlet of the APS.

15. They system as recited in claim 12, further comprising an actuation filter in the line connecting the pump outlet of the first VDP with the first outlet of the APS.

16. The system as recited in claim 12, further comprising a controller operatively connected to control the BPV, the VDP, and the ASV.

17. The system as recited in claim 13, wherein the controller is operatively connected to sensors in the CMAPS and APS for feedback in controlling the BPV, the VDP, and the ASV.

18. A method of controlling heat transfer in a fuel oil cooler (FOC) comprising:
   flowing fuel into an inlet of the FOC, through the FOC, and out an outlet of the FOC to absorb heat from oil flowing through the FOC while the oil has a temperature above a pre-determined overcooling limit;
   bypassing the FOC through a bypass valve connected in fluid communication with the inlet and the outlet in parallel with the FOC when the bum flow exceeds oil cooling demand to avoid overcooling the oil beyond a predetermined overcooling limit, wherein bypassing the FOC through the bypass valve includes actuating the bypass valve with pressurized fuel from an actuation pump sub-system (APS) with a gearbox, wherein the gearbox is connected to drive one or more fuel pumps in the APS; and
   supplying boost pressure from the APS to a combined main and augmentor pump sub-system through the FOC and/or bypass valve.

19. The method as recited in claim 18, wherein bypassing the FOC is performed aboard an aircraft without flowing any fuel through any thermal recirculation system of the aircraft.

* * * * *